United States Patent [19]

Ohmori

[11] 4,017,874
[45] Apr. 12, 1977

[54] LIGHT INTERCEPTING DEVICE FOR DATA PHOTOGRAPHING CAMERAS

[75] Inventor: Sachio Ohmori, Yokohama, Japan
[73] Assignee: Nippon Kogaku K.K., Tokyo, Japan
[22] Filed: June 12, 1975
[21] Appl. No.: 586,410
[30] Foreign Application Priority Data
    June 21, 1974    Japan .................. 49-71875[U]
[52] U.S. Cl. .............................................. 354/108
[51] Int. Cl.² ....................................... G03B 17/24
[58] Field of Search .......... 354/105, 106, 107, 108; 355/40, 39

[56] References Cited
UNITED STATES PATENTS

| | | | |
|---|---|---|---|
| 1,003,536 | 9/1911 | Spinks | 354/241 |
| 3,216,339 | 11/1965 | Kellenberger | 354/108 |
| 3,266,394 | 8/1966 | Sauer et al. | 354/108 |

FOREIGN PATENTS OR APPLICATIONS

| | | | |
|---|---|---|---|
| 952,940 | 5/1949 | France | 354/105 |
| 310,126 | 7/1921 | Germany | 354/105 |
| 341,929 | 1/1931 | United Kingdom | 354/107 |

*Primary Examiner*—John Gonzales
*Attorney, Agent, or Firm*—Fitzpatrick, Cella, Harper & Scinto

[57] ABSTRACT

A light intercepting device is constructed with a light intercepting member formed in such a manner that one end is insertable into a camera aperture by projection thereinto so as to intercept light at the data photographing portion of the actual picture frame, and a member to hold this light intercepting member, both being disposed in a gap between the camera body and the shutter curtain in the vicinity of the camera aperture.

5 Claims, 4 Drawing Figures

LIGHT INTERCEPTING DEVICE FOR DATA PHOTOGRAPHING CAMERAS

BACKGROUND OF THE INVENTION

The present invention relates to a device for intercepting light which enters into a data photographing section of a film through a picture-taking lens, when desired data such as time and date of photographing, short memorandum, etc. required at the time of photographing, are recorded from the back surface of the film.

When the required data is to be recorded in the picture frame of the film from the back surface thereof, there has been used a technique of intercepting light from the picture-taking lens and forming an image at the data photographing portion in the picture frame of the film at the time of opening of the shutter thereby to ensure sharp and clear photographing of the data on the surface of the film.

In a conventional light intercepting device of the type described above, the interception of light at the data photographing portion has been carried out by providing a rotatable light intercepting member in the form of a thin plate in a space or gap defined by the camera body and the film in the vicinity of the camera aperture so that the rotary light intercepting member may be selectively projected into the camera aperture. However, light intercepting devices of this type have a disadvantage in that the surface of the film, while running, tends to contact the rotary light intercepting member to cause scratches on the emulsion surface of the film.

Furthermore, there have been increasing demands for methods and devices by which to identify films exposed almost concurrently by the use of a plurality of cameras. To satisfy such demands, there has been devised and demonstrated, a method for forming a notch or the like at a part of the camera aperture for the identification purpose. However, from the standpoint of camera manufacturing, the provision of a different form of notch on each camera, while preferable, cannot be assured.

SUMMARY OF THE INVENTION

Accordingly, I contribute by the present invention an improved light intercepting device for a camera, wherein, by the provision of a light intercepting member on the camera body in the vicinity of the camera aperture at the back side of the film guide, I am able to eliminate the possibility of contact between the film and the light intercepting member.

I also provide an improved light intercepting device for a camera, wherein the light intercepting member is made freely attachable and detachable, as well as interchangeable, by a simple mechanism.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

Specific embodiments of the invention have been chosen for purposes of illustration and description, and are shown in the accompanying drawings, forming a part of the specification, wherein.

DESCRIPTION OF THE PREFERRED EMBODIMENTS

The present invention will be explained hereinbelow with reference to the first embodiment shown in FIGS. 1 and 2.

Figure 1:
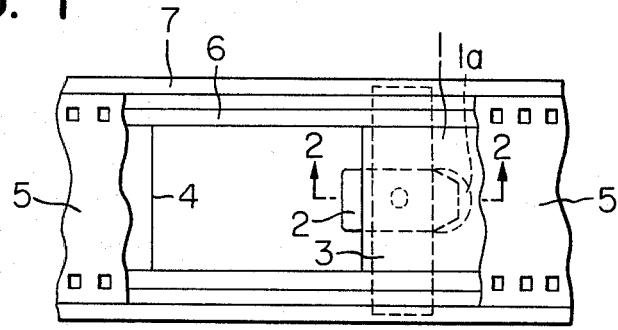
FIG. 1 is a plan view of a first embodiment of the present invention as viewed from the back cover of a camera.
Figure 2:
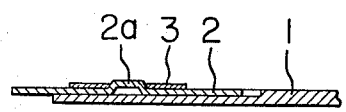
FIG. 2 is a cross-sectional view taken along the line 2—2 of FIG. 1.

FIG. 1 is a plan view of the aperture portion of a camera seen from the side of the camera back cover. The drawing illustrates a groove or recess 1a for receiving therein an insertion-type light intercepting member 2, to be described hereinafter, formed in a camera body 1 to the side of the shutter curtain. The light intercepting member 2 is provided with a click-stop projection 2a which is engaged with a mating hole formed in a leaf spring 3 when the light intercepting member 2 is inserted into the groove or recess 1a so that it may be securely held in position. The leaf spring 3 is fixed to the camera body 1 to the side of the shutter curtain with an adhesive, for example. Reference numeral 4 denotes the camera aperture, 5 designates a film, 6 indicates film guide inner rails, and 7 shows film guide outer rails. When the light intercepting member 2 is inserted into the recess 1a so as to project into the camera aperture 4, and secured at its predetermined position by the function of the click-stop projection 2a with the mating hole of the leaf spring 3, as best shown in FIG. 1, a portion of light passing through the photographing lens to form an image on the film surface is intercepted. This portion constitutes the data photographing section.

Figure 3:
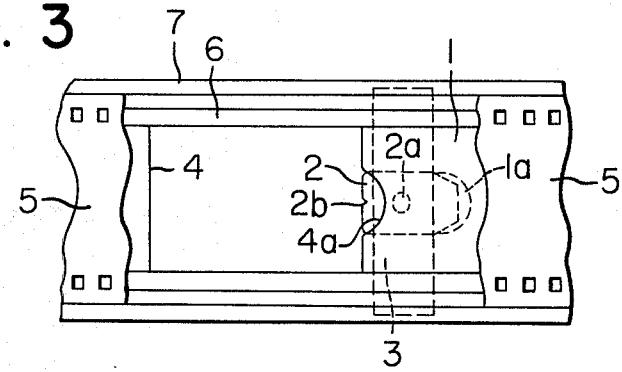
FIG. 3 is a plan view of a second embodiment of the present invention as seen from the back cover of a camera.

The second embodiment shown in FIG. 3 is substantially similar in construction to the first embodiment except that the light intercepting member 2 is provided with one or a plurality of notches 2b. The construction is such that, by inserting the light intercepting member having a notch or notches in different numbers and shapes for each camera, when taking photographs using a plurality of cameras, the light intercepting sections of different shapes are projected out, whereby the type of the camera used can be identified. It is therefore to be understood that the shapes of the notches of the light intercepting members may be varied for each camera for identification purposes. In the second embodiment, an arcuate recess 4a is formed on a portion of the camera body confronting the camera aperture 4. In this embodiment, therefore, the recess 4a and the aperture 4 effectively form the light passing aperture. The light intercepting member 2, when attached to the camera, covers the recess 4a so that an effective film area (24 × 36 mm in the case of a 35 mm film) is substantially the same shape as the aperture 4 of the first embodiment. However, if it is permissible that the effective frame area be reduced to a slight extent, the insertion-type light intercepting member 2 in the first embodiment, which is provided with such notch or notches 2b may be inserted into the camera aperture section 4 shown in FIG. 1.

Figure 4:
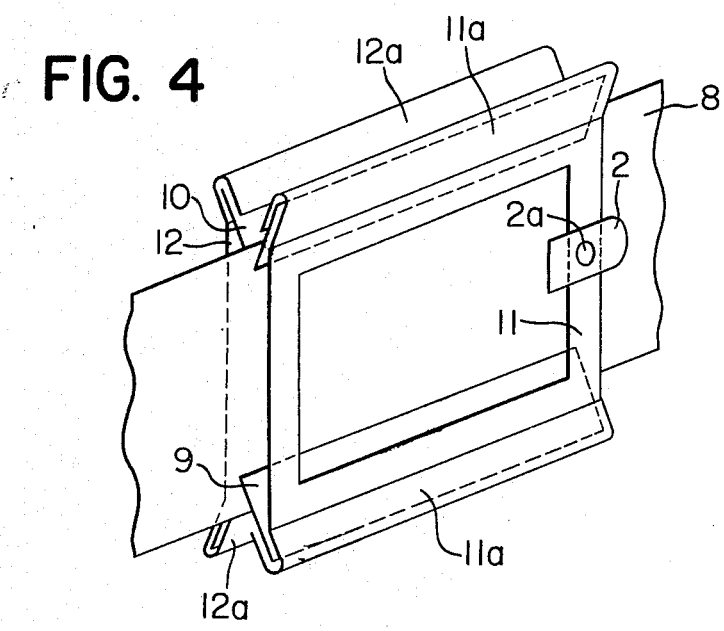
FIG. 4 is a perspective view of a third embodiment of the present invention.

In the third embodiment shown in FIG. 4, the light intercepting member 2 is mounted on a light leak preventing device for a focal-plane shutter. This light leak preventing device is used to prevent the undesired light from reaching the film surface through passage of the travelling gap of the shutter curtain.

Referring to FIG. 4, reference numeral 8 denotes a shutter curtain of a focal-plane shutter arranged to travel longitudinally or sidewise of the effective frame area, and 11, 12 designate supporting members therefor having a picture-taking opening. Both horizontal sides of each of the supporting members 11 and 12, commensurate with the travelling direction of the shutter curtain 8, are bent outwardly at a certain angle, and then are folded back upon themselves to form pinching portions 11a and 12a. Also, in pinching portions 11a and 12a, respectively, there are fixed one side of elongate light leak preventive members 9 and 10. The non-fixed end of the light leak preventive members 9 and 10 are each disposed in parallel with the travelling direction of the shutter curtain 8 and are maintained at a slight contact therewith.

In the third embodiment, the mating hole for the click-stop projection 2a of the abovementioned light intercepting member 2 is formed through one vertical side of the supporting member 11 on the side of the film surface in the light leak preventing device for the focal-plane shutter, as described above, and is used as the holding member for the abovementioned light intercepting member in place of the leaf spring 3 for click-stopping as used in the first and second embodiments. Thus, by the cooperation between the camera body 1 and this supporting member 11, the above-mentioned light intercepting member 2 may be securely held in position.

The third embodiment has a distinct advantage in that the leaf spring 3 used in the first and second embodiments, may be eliminated. In other words, for the attachment of the light intercepting member 2, it is only required to form the hole through the supporting member 11, and no additional arrangements such as the groove or recess 1a and the leaf spring 3 are required.

In the first and second embodiments, the mating hole for receiving the click-stop projection 2a of the light intercepting member 2 has been formed through the leaf spring 3, but it is to be understood that the leaf spring 3 may be provided with a click-stop projection, while its mating hole may be formed through the light intercepting member 2. In the first, second and third embodiments, the light intercepting member 2 has been attached to the right side of the camera aperture, but it is to be understood that it may be attached on any side thereof.

As described hereinabove, according to the present invention, the light intercepting member for data photographing is provided on the camera body to the back side of the film guide so contact between the light intercepting member and the film may be completely prevented. No arrangement needs be provided on the camera body to the side of the film surface, so that possible damage to the film surface may be completely avoided. Since the light intercepting member is of the engageable and disengageable type, its shape may be freely selected. Furthermore, as the light intercepting member is very simple in construction, it can be fabricated in a simple manner at a very low cost.

Although the present invention has been described with particular reference to preferred embodiments thereof, it should be understood that they are merely illustrative and not restrictive, and that any change and modification may be made without departing from the spirit and scope of the present invention as recited in the appended claims.

I believe that the construction and operation of my novel light intercepting device will now be understood and that the advantages thereof will be fully appreciated by those persons skilled in the art.

I claim:

1. In a camera comprising:
   a camera body;
   a camera aperture defined by said camera body;
   lens means disposed on one side of said camera body for directing light through said camera aperture; and
   a film guide mounted on the other side of said camera body to guide a length of film relatively to said aperature;
   a light intercepting device which comprises:
   a light intercepting member extending into said camera aperture for intercepting a part of the light passing through said camera aperture; and
   fitting means formed of a resilient member and a part of said camera body cooperating therewith provided on said one side of said camera body for frictionally receiving said light intercepting member in an attachable and detachable manner.

2. A light intercepting device as set forth in claim 1, further comprising a click-stop mechanism cooperating with said fitting means to resiliently retain said light intercepting member therein.

3. In a camera comprising:
   a camera body;
   a camera aperture defined by said camera body;
   lens means disposed on one side of said camera body for directing light through said camera aperture;
   a shutter curtain movably positioned between said camera aperture and said lens means;
   light leak preventive means for preventing undesired light from leaking around said shutter curtain;
   supporting means for supporting said light leak preventive means; and
   a film guide mounted on the other side of said camera body from said lens means to guide a length of film relatively to said aperture;
   a light intercepting device which comprises:
   a light intercepting member extending into said camera aperture for intercepting a part of the light passing through said camera aperture; and
   said supporting means and said camera body cooperating to define fitting means on said one side of said camera body for frictionally receiving said light intercepting member in an attachable and detachable manner, and wherein said light intercepting member is pinch-held between said supporting member and said camera body.

4. A light intercepting device as set forth in claim 3, wherein said supporting means is formed of a resilient material.

5. A light intercepting device as set forth in claim 4, further comprising a click-stop mechanism cooperating with said fitting means to resiliently retain said light intercepting member therein.

* * * * *